(12) United States Patent
Shim (10) Patent No.: US 10,340,708 B2
(45) Date of Patent: Jul. 2, 2019

(54) BATTERY PACK

(71) Applicant: SAMSUNG SDI CO., LTD., Yongin-si, Gyeonggi-do (KR)

(72) Inventor: Kyungsub Shim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 487 days.

(21) Appl. No.: 15/135,407

(22) Filed: Apr. 21, 2016

(65) Prior Publication Data

US 2016/0315487 A1 Oct. 27, 2016

(30) Foreign Application Priority Data

Apr. 22, 2015 (KR) .................. 10-2015-0056894

(51) Int. Cl.
*H02J 7/00* (2006.01)

(52) U.S. Cl.
CPC .......... *H02J 7/0026* (2013.01); *H02J 7/0021* (2013.01); *H02J 7/0081* (2013.01)

(58) Field of Classification Search
CPC ....... H02J 7/0021; H02J 7/0026; H02J 7/0081
USPC ........................................................ 320/112
See application file for complete search history.

(56) References Cited

U.S. PATENT DOCUMENTS

2012/0222910 A1* 9/2012 Miyagawa .............. B60L 11/14
                                                        180/291
2014/0062413 A1   3/2014 Kim

FOREIGN PATENT DOCUMENTS

KR   10-2011-0011952 A      2/2011
KR       20110011952 A  *   2/2011
KR   10-2014-0029800 A      3/2014

OTHER PUBLICATIONS

Machine Translation of KR-20110011952-A (Year: 2018).*
Deng, Q. et al., Design How-To: Integrated or discrete load switch: which one should you use? (Part 2 of 2), EE Times: Connecting the Global Electronics Community: Designlines Power Management, Website: http://www.eetimes.com/document.asp?doc_id=1272433, Mar. 17, 2008, 5 Pages, UBM Electronics, A UBM Company.
The MOSFET as a Switch, Website: http://www.electronics-tutorials.ws/transistor/tran_7.html, 2016, 7 Pages, Basic Electronics Tutorials.

* cited by examiner

*Primary Examiner* — David V Henze-Gongola
(74) *Attorney, Agent, or Firm* — Lewis Roca Rothgerber Christie LLP (57) ABSTRACT

A battery pack includes a battery comprising at least one battery cell, a first switch electrically connected between the battery and an external terminal of the battery pack, and configured to be switched in response to a first control signal, a capacitor configured to stabilize a switching state of the first switch, a second switch electrically connected in parallel to the capacitor, and configured to be switched in response to a second control signal, and a battery protection unit configured to output the first and second signals.

10 Claims, 5 Drawing Sheets

BATTERY PACK

CROSS-REFERENCE TO RELATED APPLICATION

This application claims priority to and the benefit of Korean Patent Application No. 10-2015-0056894, filed on Apr. 22, 2015, in the Korean Intellectual Property Office, the disclosure of which is incorporated herein in its entirety by reference.

BACKGROUND

1. Field

One or more exemplary embodiments relate to a battery pack, and more particularly, to a battery pack including a protection circuit capable of performing a rapid switching operation.

2. Description of the Related Art

Secondary cells are cells that convert chemical energy into electrical energy, and that discharge the electrical energy, and that also convert electrical energy supplied thereto into chemical energy. That is, secondary cells may be repeatedly charged and discharged. As secondary cells are widely used in portable electronic devices, for example, mobile phones, digital cameras, laptop computers, etc., batteries for supplying power to portable electronic devices have been actively developed.

Such batteries are typically of a battery pack type including protection circuits for controlling the charging and discharging of the batteries. Errors may occur in the batteries while they are being charged or discharged. The protection circuits are provided to protect the batteries when such errors occur, and to stably control the charging and discharging of the batteries. The protection circuits may include switches, for example, transistors or relays, to control the charging and discharging of the batteries. When stability of the switches is improved to strongly protect against external noise, a switching time of the switches increases. Due to this longer switching time, the batteries may not be protected when an error suddenly occurs.

SUMMARY

One or more exemplary embodiments include a battery pack including a protection circuit that has high stability and that has a short turn-off switching time.

Additional aspects will be set forth in part in the description that follows and, in part, will be apparent from the description, or may be learned by practice of the presented embodiments.

According to one or more exemplary embodiments, a battery pack includes a battery comprising at least one battery cell, a first switch electrically connected between the battery and an external terminal of the battery pack, and configured to be switched in response to a first control signal, a capacitor configured to stabilize a switching state of the first switch, a second switch electrically connected in parallel to the capacitor, and configured to be switched in response to a second control signal, and a battery protection unit configured to output the first and second signals.

The first switch may include a first transistor comprising a first electrode electrically connected to the battery, a second electrode electrically connected to the external terminal, and a control electrode configured to receive a first control voltage, and the capacitor may be electrically connected between the first electrode and the control electrode of the first transistor.

The first switch may further include a third transistor configured to output the first control voltage to the control electrode of the first transistor in response to the first control signal.

The second switch may include a second transistor including a first electrode and a second electrode that are respectively electrically connected to each electrode of the capacitor, and a control electrode configured to receive a second control voltage.

The second switch may further include a fourth transistor configured to output the second control voltage to the control electrode of the second transistor in response to the second control signal.

The first switch may be configured to be turned off when the second switch is turned on.

The first switch may be configured to be turned off more quickly by using the second control signal than by using the first control signal.

When a level of the first control signal transitions from a first level to a second level, the first switch may be turned off after a first amount of time passes, and, when a level of the second control signal transitions from a third level to a fourth level, the first switch may be turned off after a second amount of time passes, the second amount of time being less than the first amount of time.

The battery protection unit may include a current sensor configured to detect a current flowing between the battery and the external terminal, and a battery management system (BMS) configured to output the second control signal when a value of the current exceeds a corresponding current value.

The battery protection unit may be configured to detect an output voltage of the battery, and may be configured to output the first control signal when the output voltage exceeds a corresponding voltage range.

The battery protection unit may be configured to detect a current flowing between the battery and the external terminal, and may be configured to output the second control signal when the current exceeds a corresponding current value.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

The inventive concept will now be described more fully with reference to the accompanying drawings, in which exemplary embodiments of the inventive concept are shown.

These exemplary embodiments are provided so that the present disclosure will be thorough and complete, and will fully convey the concept of the inventive concept to those of ordinary skill in the art. The present exemplary embodiments may have different forms and should not be construed as being limited to the descriptions set forth herein.

For example, shapes, structures, and characteristics described herein may be embodied in many different forms without departing from the spirit and technical scope of the inventive concept. Also, locations or arrangements of components in each exemplary embodiment may vary without departing from the spirit and technical scope of the inventive concept. Therefore, the present disclosure is not intended to limit the inventive concept to particular modes of practice, and it is to be appreciated that all changes, equivalents, and substitutes, which do not depart from the spirit and technical scope of the inventive concept, are encompassed in the inventive concept. Like reference numerals in the drawings denote like elements. That is, detailed features described herein are merely examples. It will be understood by those of ordinary skill in the art that various changes in form and details may be made therein without departing from the spirit and scope of the inventive concept.

While such terms as "first," "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 1:
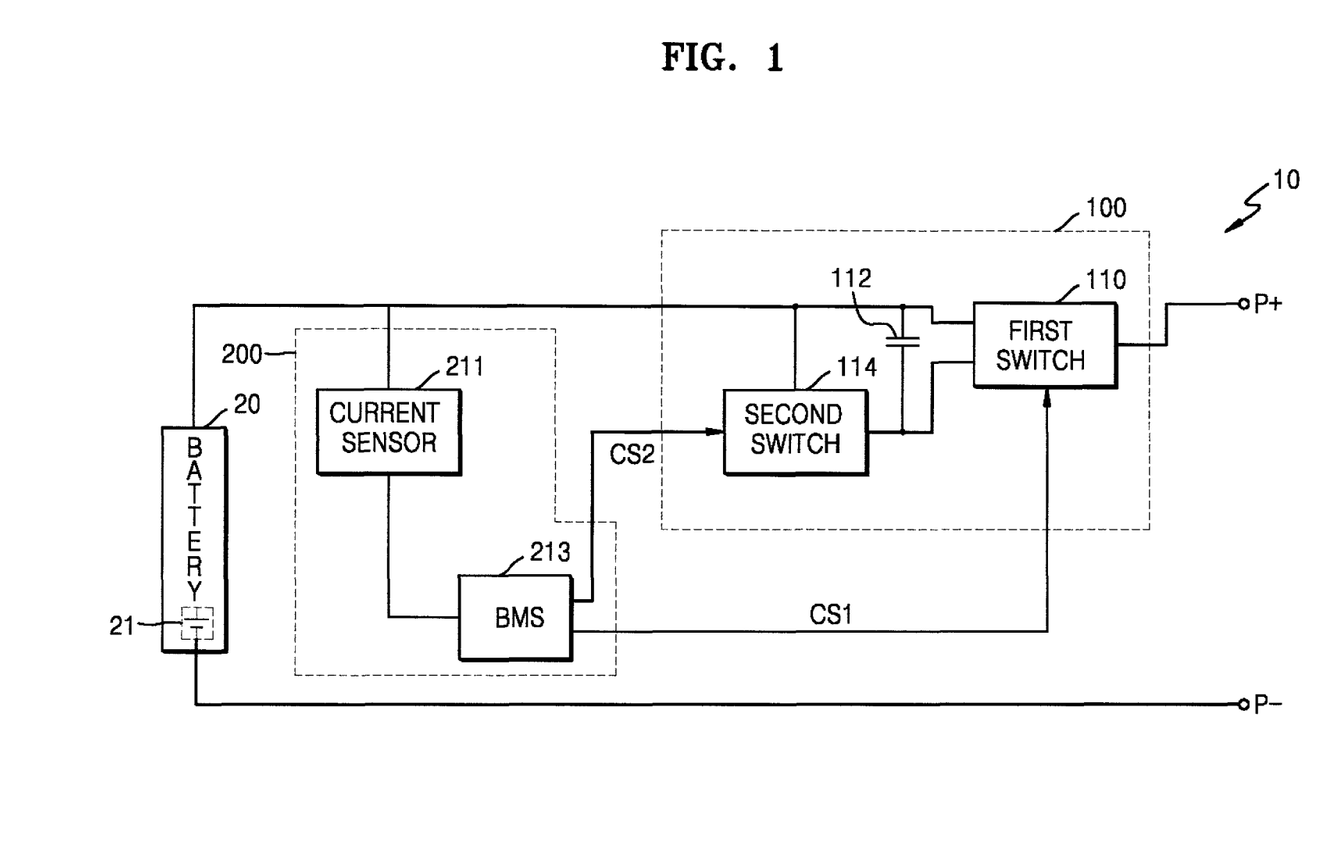
FIG. 1 illustrates a block diagram of a battery pack according to an exemplary embodiment.

FIG. 1 illustrates a block diagram of a battery pack 10 according to an exemplary embodiment.

Referring to FIG. 1, the battery pack 10 includes a battery 20, a switch unit 100, and a battery protection unit 200. The switch unit 100 includes a first switch 110, a second switch 114, and a capacitor 112.

The first switch 110 is located in a high-current path in which a charge current and a discharge current between the battery 20 and an external terminal P+ flow. The capacitor 112 is connected to the first switch 110 to stabilize a switching state of the first switch 110. The second switch 114 is connected to the capacitor 112 in parallel.

The battery protection unit 200 controls the first switch 110 and the second switch 114.

The battery 20 stores electricity and includes at least one battery cell 21.

FIG. 1 illustrates that the battery 20 includes at least one battery cell 21, although the battery 20 may include a plurality of battery cells 21 that are connected to one another in series, in parallel, or in a series-parallel combination. The number of and/or a connection method of battery cells 21 included in the battery 20 may be determined according to a required output voltage and/or electricity storage capacity.

The battery cell 21 may include a rechargeable secondary cell. For example, the battery cell 21 may include a nickel-cadmium battery, a nickel metal hydride battery (NiMH), a lithium ion battery, a lithium polymer battery, or the like, although the battery cell 21 is not limited thereto.

The battery protection unit 200 may include a battery management system 213 (hereinafter, referred to as a 'BMS') for controlling the first switch 110 and the second switch 114 to protect the battery 20. The BMS 213 may control overall operations of the battery pack 10. For example, the BMS 213 may perform an overcharge protection function, an over-discharge protection function, an overcurrent protection function, an overvoltage protection function, an overheating protection function, a cell balancing function, and the like.

The battery protection unit 200 may further include a current sensor 211 for detecting a current of the battery 20, that is, a current flowing between the battery 20 and the external terminals P+ and/or P−. The BMS 213 may obtain an amount of the current of the battery 20 by using the current sensor 211. The BMS 213 may also obtain a voltage, temperature, remaining current amount, lifetime, state of charge (SOC), etc. of the battery 20, in addition to the current of the battery 20. For example, the battery protection unit 200 may further include a voltage sensor or a temperature sensor so that the BMS 213 may obtain a cell voltage and temperature of the battery cell 21.

The BMS 213 may calculate a remaining current amount, lifetime, SOC, etc. of the battery cell 21 based on the obtained cell voltage, current, and temperature. The BMS 213 may manage the battery 20 based on the obtained cell voltage, current, temperature, the calculated SOC, and/or the like. For example, when the BMS 213 detects the occurrence of abnormal situations, for example, an overcharge, overdischarge, overcurrent, high temperature, and/or the like by using the aforementioned sensors, the BMS 213 may protect the battery 20 by controlling the first switch 110 and/or the second switch 114. The BMS 213 may output a first control signal CS1 for controlling the first switch 110, and may output a second control signal CS2 for controlling the second switch 114.

The BMS 213 and the current sensor 211 may be separate components, as illustrated in FIG. 1, or may be integrated into a component or a unit (for example, one or more integrated circuits).

The switch unit 100 receives the first control signal CS1 and/or the second control signal CS2 from the BMS 213, and may block the charge and discharge of the battery 20 based on the received first control signal CS1 and/or second control signal CS2. The switch unit 100 includes a first switch 110 controlled by the first control signal CS1, the second switch 114 controlled by the second control signal CS2, and the capacitor 112. The switch unit 100 is located on the high-current path in which the charge current and the discharge current of the battery 20 flow. FIG. 1 illustrates that the switch unit 100 is connected between a positive electrode terminal of the battery 20 and the external terminal P+, although the switch unit 100 may be connected between a negative electrode terminal of the battery 20 and the external terminal P−.

The first switch 110 is located between the battery 20 and the external terminals P+ or P−, and may block the charge and/or discharge of the battery 20 according to the first control signal CS1. As illustrated in FIG. 1, the first switch 110 may be connected between the positive terminal of the battery 20 and the external terminal P+. However, the first switch 110 may instead be connected between the negative terminal of the battery 20 and the external terminal P−. The first switch 110 may be a transistor or relay.

The capacitor 112 is connected to the first switch 110, and may function to stabilize the first switch 110. The first switch 110 may operate abnormally because of noise existing in the high-current path between the battery 20 and the external terminals P+ and P−, and/or because of noise included in the first control signal CS1. For example, when noise generated by static electricity is included in the first control signal CS1, the first switch 110 that has been turned on may be momentarily turned off due to the noise. Alternatively, the first switch 110, when turned off, may be momentarily turned on due to the noise. The capacitor 112 may absorb and remove noise flowing in the high-current path, and may absorb and remove noise that may be included in the first control signal CS1. Therefore, the capacitor 112 may prevent the first switch 110 from abnormally operating due to the noise, and may ensure the first switch 110 operates stably.

The second switch 114 is connected to the capacitor 112 in parallel, and may be controlled by the second control signal CS2 output from the BMS 213. When the second switch 114 is turned on, a first electrode and a second electrode of the capacitor 112 may be electrically short-circuited, and an electric charge stored in the capacitor 112 may be quickly discharged through the second switch 114. As the electric charge stored in the capacitor 112 is quickly discharged, switching of the first switch 110 may quickly occur. The second switch 114 may be a transistor or relay.

For example, when a level of the first control signal CS1 changes, a switching state of the first switch 110 also changes. However, although the level of the first control signal CS1 changes, the switching state of the first switch 110 may change after the electric charge stored in the capacitor 112 is discharged, or after a given amount of electric charge remains stored in the capacitor 112, due to the presence of the capacitor 112 for stabilizing the switching state of the first switch 110. That is, a time delay exists between a first point in time when the level of the first control signal CS1 changes, and second a point in time when a switching behavior of the first switch 110 occurs (e.g., when the first switch 110 actually switches). The second switch 114 may quickly discharge the electric charge stored in the capacitor 112. Therefore, when the second switch 114 is turned on, the electric charge stored in the capacitor 112 may be quickly discharged, and accordingly, the first switch 110 may be quickly switched.

For example, as the second switch 114 is turned on, the electric charge stored in the capacitor 112 may be quickly discharged, and accordingly, the first switch 110 may be quickly turned off. Therefore, an amount of time taken to turn off the first switch 110 by turning on the second switch 114 using the second control signal CS2 may be less than an amount of time otherwise taken to turn off the first switch 110 using the first control signal CS1.

The first switch 110 and the second switch 114 may be respectively controlled by the first control signal CS1 and the second control signal CS2. The BMS 213 may detect the occurrence of abnormal situations, such as an overcharge, overdischarge, overcurrent, or high temperature in the battery 20, and in this case, the BMS 213 may output the first control signal CS1 and/or the second control signal CS2 in order to control the first switch 110 and/or the second switch 114, respectively.

The first control signal CS1 may have a first level and a second level. The first switch 110 may be turned on in response to the first control signal CS1 having the first level, and may be turned off in response to the first control signal CS1 having the second level. For example, in accordance with a configuration of the first switch 110, the first level may be a high level, and the second level may be a low level.

The second control signal CS2 may have a third level and a fourth level. The second switch 114 may be turned on in response to the second control signal CS2 having the fourth level, and may be turned off in response to the second control signal CS2 having the third level. For example, in accordance with a configuration of the second switch 114, the fourth level may be a low level, and the third level may be a high level.

When a level of the first control signal CS1 transitions from the first level to the second level, the first switch 110 that has been turned on may be turned off. A time delay for discharging the electric charge stored in the capacitor 112 may exist between a first point in time when the level of the first control signal CS1 moves from the first level to the second level, and a second point in time when the first switch 110 switched.

When a level of the second control signal CS2 switches from the third level to the fourth level, the second switch 114 that has been turned off may be turned on. When the second switch 114 is turned on, the electric charge stored in the capacitor 112 is quickly discharged through the second switch 114, and the first switch 110 is turned off without delay. That is, when the level of the second control signal CS2 transitions from the third level to the fourth level, the first switch 110 is turned off in less time than the amount time taken to turn off the first switch 110 by using the first control signal CS1.

When abnormal situations, such as an overcharge, overdischarge, or high temperature occurs in the battery 20, the BMS 213 may output the first control signal CS1 having the second level to the first switch 110.

For example, the battery protection unit 200 is able to detect an output voltage of the battery 20 and, when the output voltage exceeds a given voltage range/voltage value, the battery protection unit 200 may output the first control signal CS1 having the second level in order to turn off the first switch 110. To this end, the battery protection unit 200 may further include a voltage sensor for detecting an output voltage of the battery 20. The voltage sensor is able to measure an output voltage of the battery 20, and may transmit the measured output voltage to the BMS 213. When the BMS 213 detects that the output voltage of the battery 20 exceeds a safe voltage range, the BMS 213 may output the first control signal CS1 having the second level.

When a sudden abnormal situation, such as an overcurrent, occurs in the battery 20 due to a short circuit, etc., the BMS 213 may output the second control signal CS2 having the fourth level to the second switch 114. For example, when a current detected by the current sensor 211 exceeds a safe current value, the BMS 213 may output the second control signal CS2 having the fourth level to turn on the second switch 114. As described above, when the second switch 114 is turned on, the electric charge stored in the capacitor 112 is quickly discharged, and thus, the first switch 110 is turned off without any delay.

According to another exemplary embodiment, in case of emergency, the BMS 213 outputs the first control signal CS1 having the second level to the first switch 110, and may also output the second control signal CS2 having the fourth level to the second switch 114.

Figure 2:
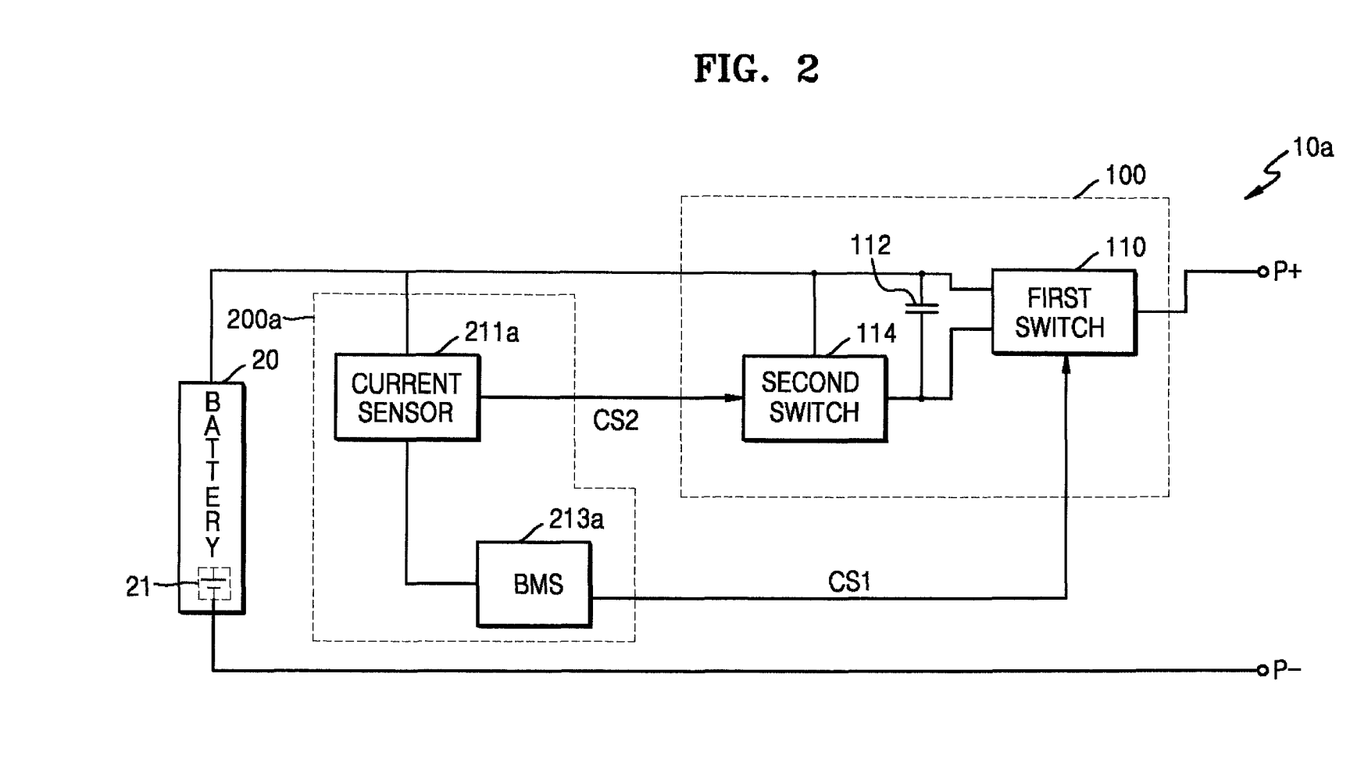
FIG. 2 illustrates a block diagram of a battery pack according to another exemplary embodiment.

FIG. 2 illustrates a block diagram of a battery pack 10a according to another exemplary embodiment.

Referring to FIG. 2, the battery pack 10a includes the battery 20, the switch unit 100, and a battery protection unit 200a. The battery 20 and the switch unit 100 respectively correspond to the battery 20 and the switch unit 100 of FIG. 1, and thus descriptions thereof will not be repeated. The battery protection unit 200a includes a current sensor 211a and a BMS 213a.

In comparison with the BMS 213 of FIG. 1, the BMS 213a is substantially the same as the BMS 213 of FIG. 1, except for the feature that the second control signal CS2 is not output to the second switch 114 by the BMS 213a of FIG. 2. However, according to another exemplary embodiment, the BMS 213a may output a third control signal (not shown) to the second switch 114 in a manner similar to the output of the second control signal CS2 to the second switch 114 by the BMS 213 of FIG. 1. The second switch 114 may operate based on the second control signal CS2, and based on a logical operation of the third control signal, for example, a logical sum.

The current sensor 211a outputs the second control signal CS2 for controlling the second switch 114. The current sensor 211a may detect a current of the battery 20, that is, may detect a current flowing between the battery 20 and the external terminal P+ or P−. The current sensor 211a may provide the detected current to the BMS 213a. Also, the current sensor 211a may output the second control signal CS2 having the fourth level that is used to turn on the second switch 114, when the current of the battery 20 exceeds a given current value.

For example, when an emergency such as a short circuit occurs, the current sensor 211a detects an overcurrent, and may output the second control signal CS2 for directly turning on the second switch 114. If the current sensor 211a provides a processor of BMS 213a with information about the overcurrent, and the processor outputs a control signal for turning on the second switch 114, the processor may require a sampling time for detecting the overcurrent and an operation time for outputting the control signal. Therefore, although the emergency such as a short circuit occurs, it may take some amount of time to turn off the first switch 110. According to the present exemplary embodiment, when the current of the battery 20 exceeds a given current value, the current sensor 211a directly outputs the second control signal CS2, and thus, the first switch 110 is quickly turned off (e.g., without a sampling time and an operation time), thereby safely protecting the battery 20 and the switch unit 100 in case of emergency.

In other words, when a current flowing between the battery 20 and the external terminal P+ or P− exceeds a given current value, the amount of time taken by the current sensor 211a to output the second control signal CS2 is less than the amount of time that would be taken by the BMS 213 of FIG. 1 to detect the current of the battery 20, to determine whether the current of the battery 20 exceeds a given current value, and to output a control signal for controlling the second switch 114. The reduced time is due to the fact that the current sensor 211a does not perform an operation for receiving and analyzing current information to output a control signal. Therefore, in case of emergency, the second switch 114 is turned on due to the second control signal CS2, which is directly output by the current sensor 211a, thereby quickly turning off the first switch 110, and thus, quickly blocking current flow.

According to an exemplary embodiment, the current sensor 211a may include a comparator for outputting the second control signal CS2. A first voltage signal corresponding to the current of the battery 20 is input to a first input terminal of the comparator, and a second voltage signal corresponding to a given current value may be input to a second input terminal of the comparator. For example, when a voltage level of the first voltage signal is greater than a voltage level of the second voltage signal, the comparator may output the second control signal CS2 having a fourth level. The second switch 114 may receive the second control signal CS2 having the fourth level and then may be turned on.

As described above, when the current sensor 211a outputs the second control signal CS2 having the fourth level, the second switch 114 is turned on, and thus, the electric charges stored in the capacitor 112 may be quickly discharged. Therefore, the first switch 110 may be immediately turned off without any delay.

The current sensor 211a provides information about an overcurrent to the BMS 213a, and the BMS 213a may output the first control signal CS1 having the second level to turn off the first switch 110.

According to another exemplary embodiment, the battery pack 10a may further include a voltage sensor for measuring a terminal voltage between the external terminals P+ and P−. The voltage sensor may directly output a control signal for turning on the second switch 114 when the terminal voltage between the external terminals P+ and P− exceeds a given voltage value. The second switch 114 may be controlled by the control signal and by a logical operation of the second control signal CS2, for example, a logical sum.

When the terminal voltage between the external terminals P+ and P− exceeds the given voltage value, an amount of time taken by the voltage sensor to output the control signal may be less than an amount of time taken by the BMS 213 of FIG. 1 to detect the terminal voltage, to determine whether the terminal voltage exceeds the given voltage value, and to output the control signal for turning on the second switch 114. This reduced amount of time is due to the fact that the voltage sensor does not perform the same analysis operation performed by the BMS 213 of FIG. 1. Therefore, the second switch 114 is turned on through the control signal, which is directly output by the voltage sensor, to quickly turn off the first switch 110, and thus, the battery 20 may be quickly protected from a voltage exceeding the given voltage value.

According to another exemplary embodiment, the battery pack 10a may also output the first control signal CS1 for turning off the first switch 110 when the second switch 114 is turned on.

Figure 3:
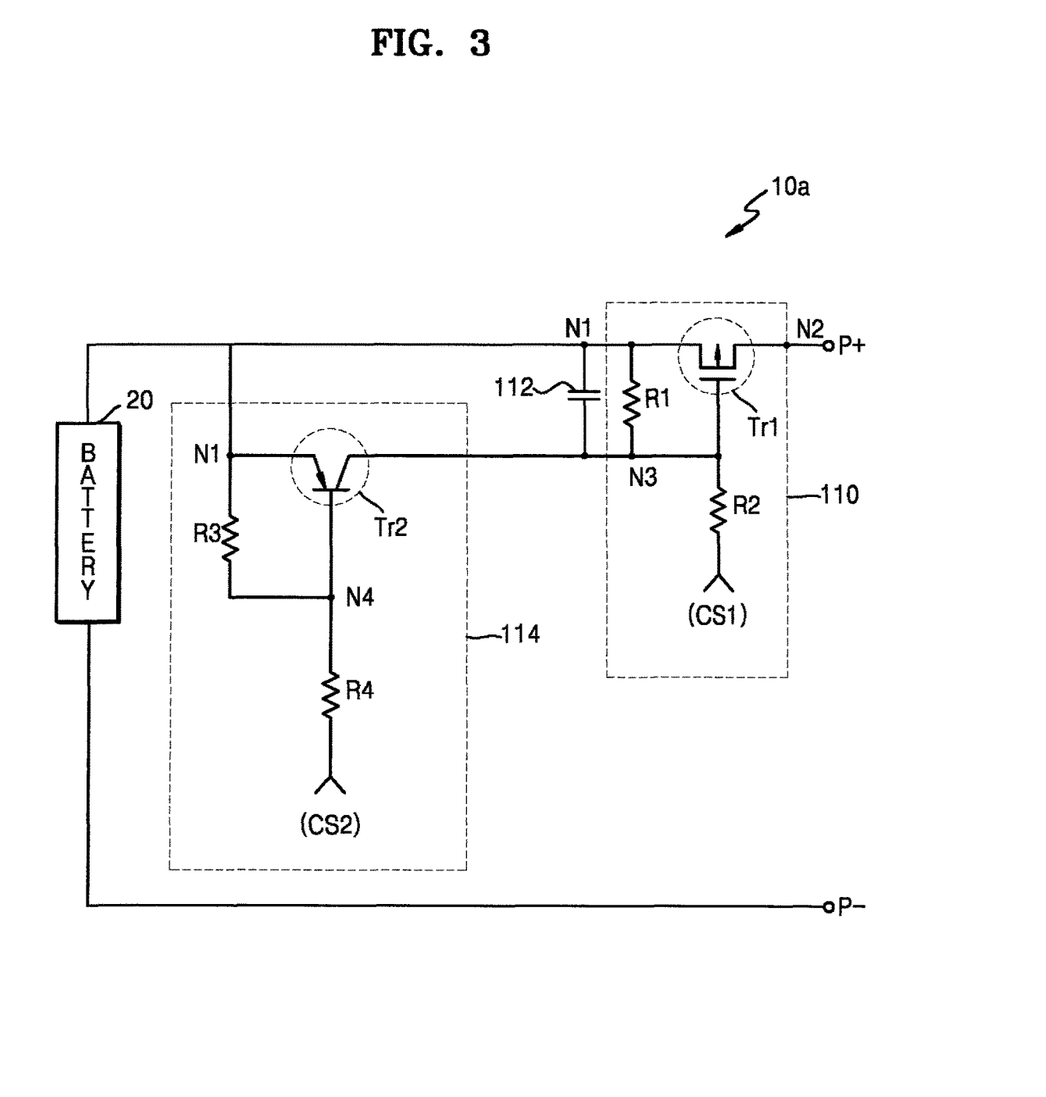
FIG. 3 illustrates an exemplary circuit of a switching unit of a battery pack according to an exemplary embodiment.

FIG. 3 illustrates an exemplary circuit of the switching unit 100 of the battery pack 10a according to an exemplary embodiment.

Referring to FIG. 3, the switch unit 100 includes the first switch 110, the second switch 114, and the capacitor 112. As illustrated in FIG. 3, the switch unit 100 is located between a positive terminal of the battery 20 and the external terminal P+, but is not limited thereto. For example, the switch unit 100 may instead be located between a negative terminal of the battery 20 and the external terminal P−.

The first switch 110 may include a first transistor Tr1, a first resistor R1, and a second resistor R2. The second switch 114 may include a second transistor Tr2, third resistor R3, and fourth resistor R4. The first transistor Tr1 and the second transistor Tr2 may be a metal oxide silicon field effect transistor (MOSFET) or a bipolar transistor (BJT), although the inventive concept is not limited thereto. As described below, FIG. 3 illustrates that the first transistor Tr1 is a P-type MOSFET, and the second transistor Tr2 is a PNP BJT, although the inventive concept is not limited thereto.

A first electrode (for example, a source or emitter) of the first transistor Tr1 is connected to the battery 20 via a first node N1, and a second electrode (for example, a drain or collector) of the first transistor Tr1 is connected to the external terminal P+ via a second node N2. A control electrode (for example, a gate or base) of the first transistor Tr1 is connected to a third node N3. The first resistor R1 is connected between the first node N1 and the third node N3. A first terminal of the second resistor R2 is connected to the third node N3. Further, for example, the first control signal CS1, which may be output from the BMS 213 of FIG. 1 or the BMS 213a of FIG. 2, may be applied to a second terminal of the second resistor R2. The first control signal CS1 may be referred to as a first control voltage. As another example, the first control voltage may be generated based on the first control signal CS1 output from the BMS 213 of FIG. 1 or the BMS 213a of FIG. 2, and may be applied to the second terminal of the second resistor R2.

Unlike the first switch 110 of FIG. 1 or FIG. 2, when the first control signal CS1 is a low level, the first transistor Tr1 of the embodiment of FIG. 3 is turned on, and thus, the first node N1 and the second node N2 may be electrically connected to each other. That is, a current may flow between the battery 20 and the external terminal P+. Contrastingly, when the first control signal CS1 is a high level, the first transistor Tr1 is turned off, the first node N1 and the second node N2 may be electrically insulated from each other. That is, the current flowing between the battery 20 and the external terminal P+ may be blocked.

The capacitor 112 is connected between the first node N1 and the third node N3. The capacitor 112 is connected between the first electrode of the first transistor Tr1 and a control electrode, and thus, a voltage between the first electrode of the first transistor Tr1 and the control electrode may be maintained. The capacitor 112 absorbs noise transmitted from the external terminal P+ or noise included in the first control signal CS1 and thus may prevent the first transistor Tr1 from being switched by the noise.

The first electrode (e.g., an emitter or source) of the second transistor Tr2 is connected to the first node N1, and the second electrode (e.g., a collector or drain) is connected to the third node N3. A control electrode (e.g., a base or gate) of the second transistor Tr2 is connected to a fourth node N4. The third resistance R3 is connected between the first node and the fourth node N4. A first terminal of the fourth resistor R4 is connected to the fourth node N4, and, for example, the second control signal CS2 output from the BMS 213 of FIG. 1 or the current sensor 211a of FIG. 2, may be applied to a second terminal. The second control signal CS2 may be referred to as a second control voltage. As another example, the second control voltage generated based on the second control signal CS2, which are output from the BMS 213 of FIG. 1 or the current sensor 211a of FIG. 2, may be applied to the second terminal of the fourth resistor R4.

When the second control signal CS2 is a low level, the second transistor Tr2 is turned on, and thus, the first node N1 and the third node N3 are electrically connected to each other. That is, as the first electrode and the second electrode of the capacitor 112 is electrically connected to each other, the electric charges stored in the capacitor 112 may be momentarily discharged. When the second control signal CS2 is a high level, the second transistor Tr2 is turned off, and thus, the first node N1 and the third node N3 are electrically insulated from each other.

When a level of the first control signal CS1 is transited from the low level to the high level, a voltage of the control electrode of the first transistor Tr1 may gradually increase to a high level due to the capacitor 112. Therefore, the first transistor Tr1 is turned off after a delay time taken to discharge the electric charges stored in the capacitor 112 by the first resistor R1 passes. When the level of the first control signal CS1 is transited from the high level to the low level, the first transistor Tr1 is turned on after the delay time passes due to the capacitor 112.

When a level of the second control signal CS2 is transited from the high level to the low level, the second transistor Tr2 is turned on, and the electric charge stored in the capacitor 112 may be momentarily discharged by the second transistor Tr2. Therefore, a voltage between the first node N1 and the third node N3 may be substantially equal to 0, and thus, the first transistor Tr1 may be turned off without any delay.

According to an exemplary embodiment, the first switch 110 may be stably controlled by the first control signal CS1. In case of emergency such as a short circuit, the first switch 110 may be quickly turned off by using the second control signal CS2. Therefore, damage of the battery 20 and/or the first transistor Tr1 by an overcurrent may be prevented.

Figure 4:
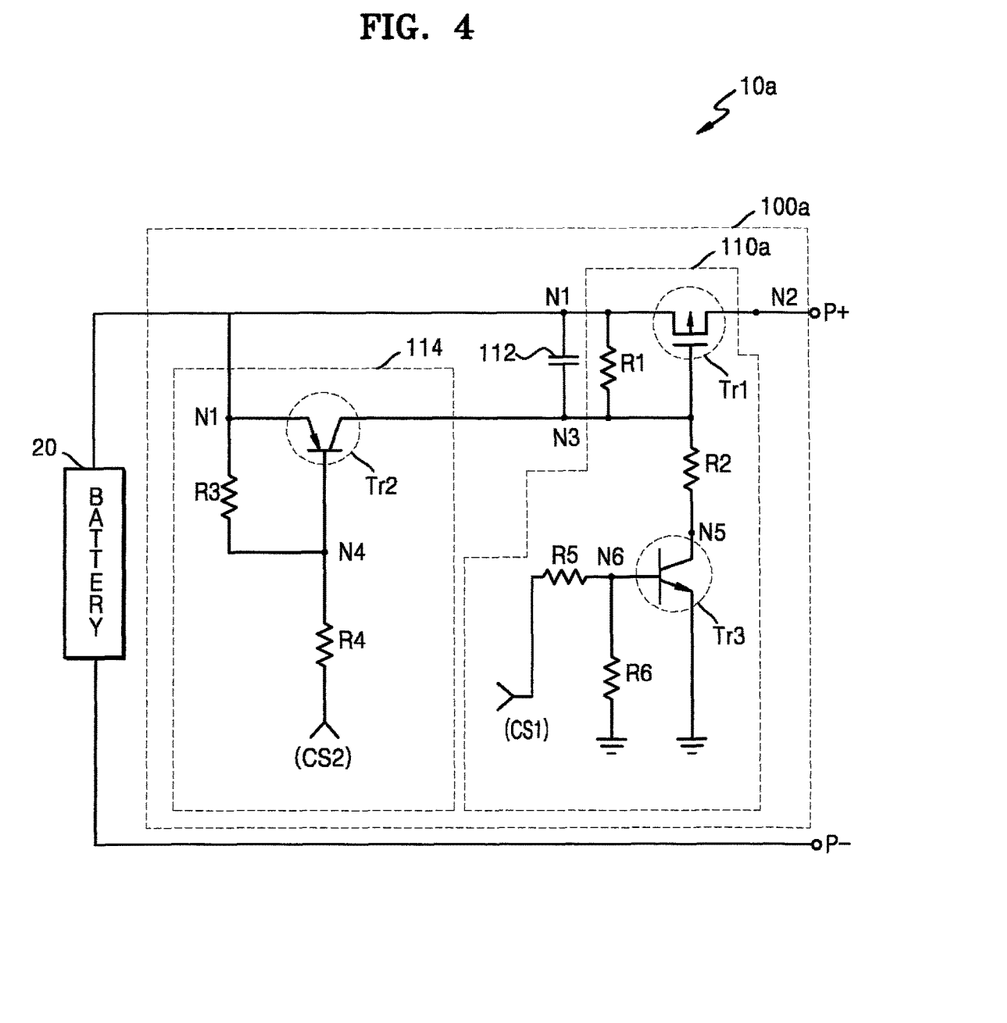
FIG. 4 illustrates an exemplary circuit of a switching unit of a battery pack according to another exemplary embodiment.

FIG. 4 illustrates an exemplary circuit of a switching unit 100a of the battery pack 10a according to another exemplary embodiment.

Referring to FIG. 4, the switch unit 100a includes a first switch 110a, the second switch 114, and the capacitor 112. Because the second switch 114 and the capacitor 112 have been described with reference to FIG. 3, the descriptions thereof will not be repeated.

The first switch 110a includes the first transistor Tr1, a third transistor Tr3, the first resistor R1, the second resistor R2, a fifth resistor R5, and a sixth resistor R6. The first transistor Tr1, the first resistor R1, and the second resistor R2 are substantially the same as the first switch 110 of FIG. 3, and thus, descriptions thereof will not be repeated.

The third transistor Tr3 may be a MOSFET or a BJT. FIG. 4 illustrates that the third transistor Tr3 is an NPN BJT, but the inventive concept is not limited thereto. As described below, it is assumed that the third transistor Tr3 is an NPN BJT.

A first electrode (e.g., a collector or drain) of the third transistor Tr3 is connected to a fifth node N5, and a second electrode (e.g., an emitter or source) is grounded. A control electrode of the third transistor Tr3 is connected to a sixth node N6. The sixth resistor R6 is connected between the sixth node N6 and ground. A first terminal of the fifth resistor R5 is connected to the sixth node N6, and the first control signal CS1 output from the BMS 213 of FIG. 1 or the BMS 213a of FIG. 2 may be applied to a second terminal of the fifth resistor R5.

In the present embodiment, when the first control signal CS1 is a high level, the third transistor Tr3 is turned on, and the fifth node N5 is connected to the ground. When the fifth node N5 is connected to the ground, a control voltage having a low level is applied to the control electrode of the first transistor Tr1, causing the first transistor Tr1 to be turned on, and thus, the first node N1 and the second node N2 are electrically connected to each other. That is, a current may flow between the battery 20 and the external terminal P+.

Contrastingly, when the first control signal CS1 is a low level, the third transistor Tr3 is turned off, and thus, the fifth node N5 is floated. When the fifth node N5 is floated, a voltage of the third node N3 becomes substantially the same as a voltage of the first node N1, and a voltage having a high level is applied to the control electrode of the first transistor Tr1. As a result, the first transistor Tr1 is turned off, and the first node N1 and the second node N2 are, electrically insulated from each other. That is, current flow between the battery 20 and the external terminal P+ may be blocked.

A voltage level of the first control signal CS1 may be determined according to electrical characteristics of the third transistor Tr3 independently of a voltage level of the battery 20. In other words, the third transistor Tr3 is connected to the control electrode of the first transistor Tr1, and thus, the first switch 110a may be controlled even though the first control signal CS1 does not have a voltage that is as high as the voltage of the first node N1. Also, the second transistor Tr2 that is turned on by the second control signal CS2 may prevent the voltage of the battery 20, that is, the voltage of the first node N1, from being applied to the external terminal P+, even without the BMS 213 of FIG. 1 or the BMS 213a of FIG. 2 outputting the first control signal CS1.

Figure 5:
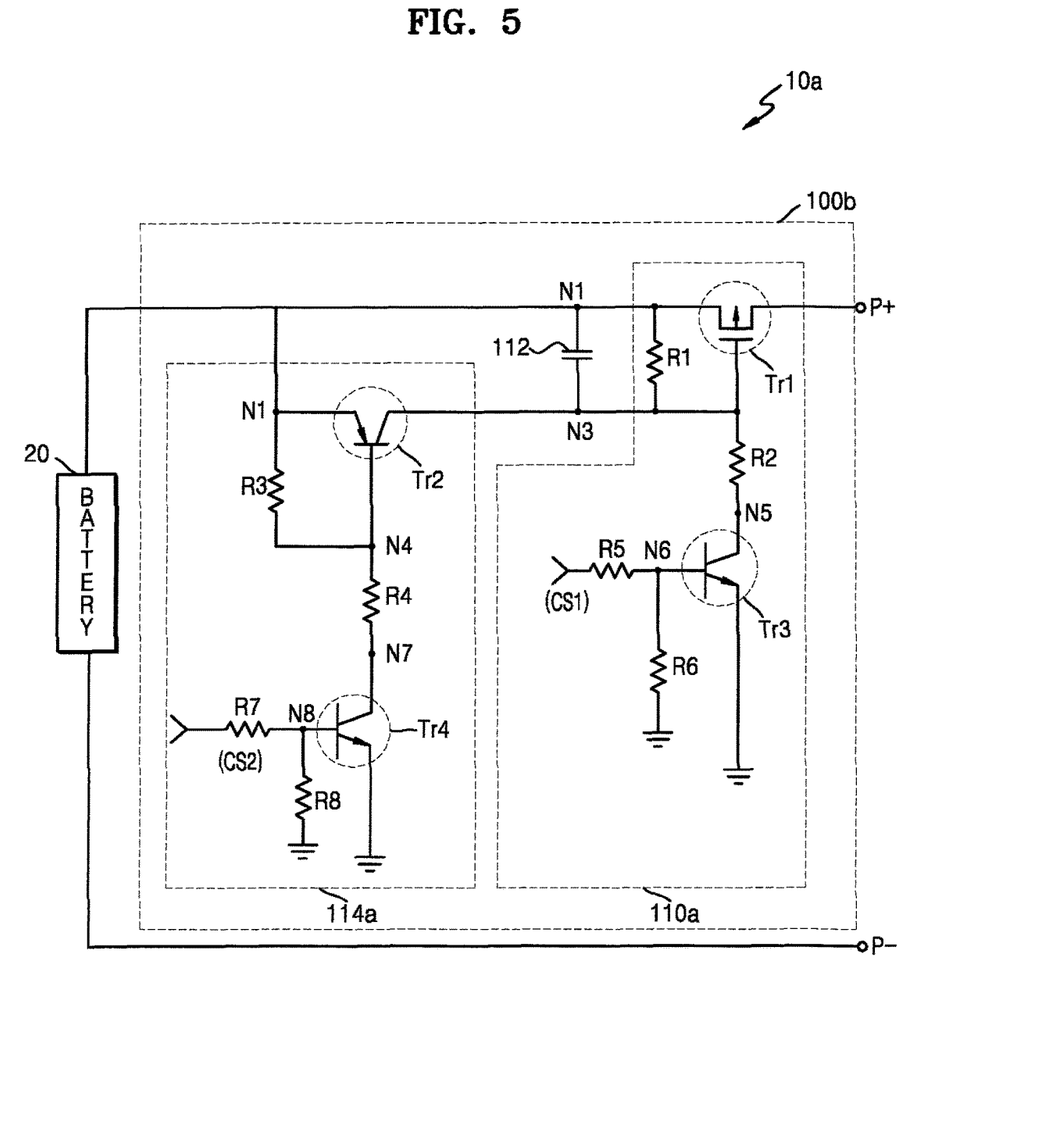
FIG. 5 illustrates an exemplary circuit of a switching unit of a battery pack according to another exemplary embodiment.

FIG. 5 illustrates an exemplary circuit of a switching unit 100b of the battery pack 10a according to another exemplary embodiment.

Referring to FIG. 5, the switch unit 100b includes the first switch 110a, a second switch 114a, and the capacitor 112. The first switch 110a and the capacitor 112 have been described with reference to FIG. 4, and thus, descriptions thereof will not be repeated.

The second switch 114a includes the second transistor Tr2, a fourth transistor Tr4, the third resistor R3, the fourth resistor R4, a seventh resistor R7, and an eighth resistor R8. The second transistor Tr2, the third resistor R3, and the fourth resistor R4 are substantially the same as those of the second switch 114 of FIG. 3, and thus, descriptions thereof will not be repeated.

The fourth transistor Tr4 may be a MOSFET or a BJT. FIG. 5 illustrates that the fourth transistor Tr4 is an NPN BJT, but the inventive concept is not limited thereto. As described below, it is assumed that the fourth transistor Tr4 is an NPN BJT.

A first electrode (e.g., a collector or drain) of the fourth transistor Tr4 is connected to a seventh node N7, and a second electrode (e.g., an emitter or source) is grounded. A control electrode of the fourth transistor Tr4 is connected to an eighth node N8. The eighth resistor R8 is connected between the eighth node N8 and ground. A first terminal of the seventh resistor R7 is connected to the eighth node N8, and, for example, the second control signal CS2 output from the BMS 213 of FIG. 1 or output from the current sensor 211a of FIG. 2 is applied to a second terminal of the seventh resistor R7.

Unlike the second switch 114 of FIG. 1 or FIG. 2, when the second control signal CS2 is a high level, the fourth transistor Tr4 is turned on, and the seventh node N7 is thereby connected to the ground. When the seventh node N7 is connected to the ground, a control voltage having a low level is applied to the control electrode of the second transistor Tr2, causing the second transistor Tr2 to be turned on, and thus, causing the third node N3 and the first node N1 to be electrically connected to each other. Then, the electric charge stored in the capacitor 112 is momentarily discharged via the second transistor Tr2. Therefore, a voltage between the third node N3 and the first node N1 is substantially equal to 0, and thus, the first transistor Tr1 may be turned off without any delay.

Contrastingly, when the second control signal CS2 is a low level, the fourth transistor Tr4 is turned off, and thus, the seventh node N7 is floated. When the seventh node N7 is floated, a voltage of the fourth node N4 becomes substantially the same as a voltage of the first node N1, and a voltage having a high level is applied to the control electrode of the second transistor Tr2. As a result, the second transistor Tr2 is turned off, and the first node N1 and the third node N3 are electrically insulated from each other. Accordingly, the first switch 110a is controlled according to the first control signal CS1.

A voltage level of the second control signal CS2 may be determined according to electrical characteristics of the fourth transistor Tr4, regardless of a voltage level of the battery 20. In other words, the control electrode of the second transistor Tr2 is connected to the fourth transistor Tr4, and thus, the second control signal CS2 may control the second switch 114a even though the second control signal CS2 does not have a voltage as high as the voltage of the first node N1.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A battery pack comprising:
a battery comprising at least one battery cell;
a first switch electrically connected between the battery and an external terminal of the battery pack, and configured to be switched in response to a first control signal;
a capacitor configured to stabilize a switching state of the first switch;
a second switch electrically connected in parallel to the capacitor, and configured to be switched in response to a second control signal to discharge the capacitor when turned on; and
a battery protection unit configured to output the first and second control signals,
wherein the first switch is configured to be turned off when the second switch is turned on.

2. The battery pack of claim 1, wherein the first switch comprises a first transistor comprising a first electrode electrically connected to the battery, a second electrode electrically connected to the external terminal, and a control electrode configured to receive a first control voltage, and
wherein the capacitor is electrically connected between the first electrode and the control electrode of the first transistor.

3. The battery pack of claim 2, wherein the first switch further comprises a third transistor configured to output the first control voltage to the control electrode of the first transistor in response to the first control signal.

4. The battery pack of claim 1, wherein the second switch comprises a second transistor comprising a first electrode and a second electrode that are respectively electrically connected to each electrode of the capacitor, and a control electrode configured to receive a second control voltage.

5. The battery pack of claim 4, wherein the second switch further comprises a fourth transistor configured to output the second control voltage to the control electrode of the second transistor in response to the second control signal.

6. The battery pack of claim 1, wherein the first switch is configured to be turned off more quickly by using the second control signal than by using the first control signal.

7. The battery pack of claim 1, wherein, when a level of the first control signal transitions from a first level to a second level, the first switch is turned off after a first amount of time passes, and
when a level of the second control signal transitions from a third level to a fourth level, the first switch is turned off after a second amount of time passes, the second amount of time being less than the first amount of time.

8. The battery pack of claim 1, wherein the battery protection unit comprises:
a current sensor configured to detect a current flowing between the battery and the external terminal; and
a battery management system (BMS) configured to output the second control signal when a value of the current exceeds a corresponding current value.

9. The battery pack of claim 1, wherein the battery protection unit is configured to detect an output voltage of the battery, and is configured to output the first control signal when the output voltage exceeds a corresponding voltage range.

10. The battery pack of claim 1, wherein the battery protection unit is configured to detect a current flowing between the battery and the external terminal, and is configured to output the second control signal when the current exceeds a corresponding current value.

* * * * *